(12) United States Patent
Musella

(10) Patent No.: US 11,372,112 B2
(45) Date of Patent: Jun. 28, 2022

(54) GNSS RECEIVER APPARATUS WITH GNSS PSEUDO RANDOM NOISE DELAYED SEQUENCE GENERATOR

(71) Applicant: STMicroelectronics S.r.l., Agrate Brianza (IT)

(72) Inventor: Gennaro Musella, Cornaredo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 335 days.

(21) Appl. No.: 16/542,601

(22) Filed: Aug. 16, 2019

(65) Prior Publication Data

US 2020/0064492 A1 Feb. 27, 2020

(30) Foreign Application Priority Data

Aug. 22, 2018 (IT) .................. 102018000008158

(51) Int. Cl.
| | |
|---|---|
| G01S 19/36 | (2010.01) |
| G01S 19/30 | (2010.01) |
| G01S 19/21 | (2010.01) |
| G01S 19/24 | (2010.01) |
| G01S 19/23 | (2010.01) |

(52) U.S. Cl.
CPC .............. *G01S 19/36* (2013.01); *G01S 19/21* (2013.01); *G01S 19/23* (2013.01); *G01S 19/243* (2013.01); *G01S 19/30* (2013.01)

(58) Field of Classification Search
CPC ........ G01S 19/21; G01S 19/23; G01S 19/243; G01S 19/30; G01S 19/36
See application file for complete search history.

(56) References Cited

U.S. PATENT DOCUMENTS

| | | | | |
|---|---|---|---|---|
| 5,414,729 | A | * | 5/1995 | Fenton .................... G01S 19/22 342/357.61 |
| 6,483,867 | B1 | * | 11/2002 | Mannermaa ............ G01S 19/29 370/335 |
| 6,603,803 | B1 | * | 8/2003 | Hatch ..................... G01S 19/22 342/357.29 |
| 2002/0186794 | A1 | | 12/2002 | Oesch et al. |
| 2007/0064776 | A1 | * | 3/2007 | Feller ...................... G01S 19/22 375/149 |
| 2015/0200708 | A1 | * | 7/2015 | Yu ....................... H04B 1/70754 375/150 |

FOREIGN PATENT DOCUMENTS

JP 2004201005 A 7/2004

* cited by examiner

*Primary Examiner* — Dao L Phan
(74) *Attorney, Agent, or Firm* — Slater Matsil, LLP

(57) ABSTRACT

A GNSS (Global Navigation Satellite System) receiver apparatus includes a bank of correlators configured to receive in-phase and quadrature versions of a received signal. A code numerical controlled oscillator is configured to determine a code frequency. A GNSS pseudo random noise sequence generator is configured to generate a pseudo random noise sequence at the code frequency set by the code numerical controlled oscillator. A GNSS pseudo random noise delayed sequence generator includes a first shift register and a second shift register. Taps of the shift registers are selectable as a punctual replica, an early replica and a delayed replica of the pseudo random noise sequence. An enable circuit is configured to generate an enable signal coupled to an enable input of the flip-flops, the enable signal operating at a selectable enable frequency.

20 Claims, 9 Drawing Sheets

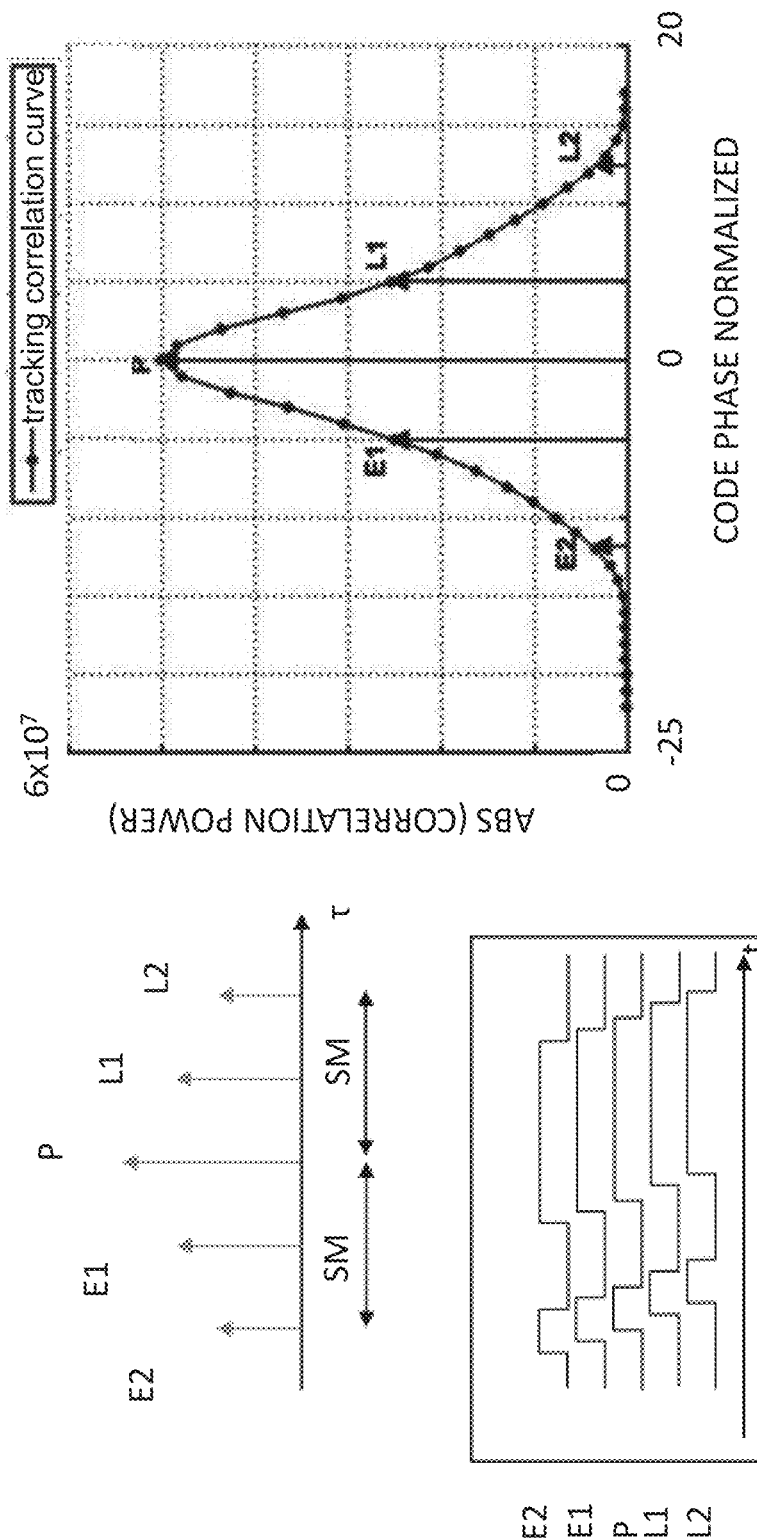
Fig. 5A
Fig. 5B
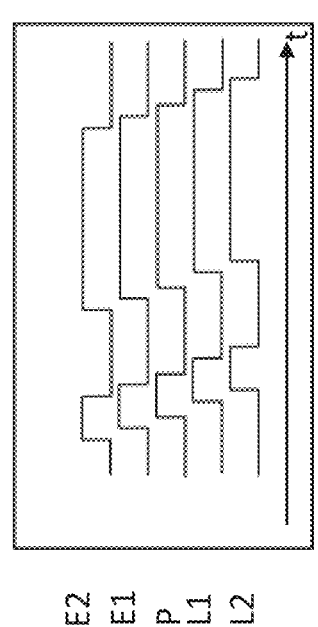
Fig. 4

GNSS RECEIVER APPARATUS WITH GNSS PSEUDO RANDOM NOISE DELAYED SEQUENCE GENERATOR

CROSS-REFERENCE TO RELATED APPLICATIONS

This application claims priority to Italian Patent Application No. 102018000008158, filed on Aug. 22, 2018, which application is hereby incorporated herein by reference.

TECHNICAL FIELD

Embodiments of the present disclosure relate to a GNSS (Global Navigation Satellite System) receiver apparatus comprising a GNSS PRN delayed sequence generator and a related generation method.

BACKGROUND

A navigation receiver operates by down converting to quasi baseband the input signal received from the satellites, which is transmitted at L band (1-2 GHz), using a local oscillator to step down the input frequency and allow a baseband digital management of the Satellite information.

With reference to FIG. 1, which diagrammatically shows a GNSS (Global Navigation Satellite System) system 1000 (such as, for example, Global Positioning System (GPS), Global'naya Navigatsionnaya Sputnikovaya Sistema (translated from Russian as Global Navigation Satellite System) (GLONASS), Galileo System, or other types of satellite-based positioning systems, such global satellite positioning system 1000 comprises a constellation of a number NS of satellites $S_1$-$S_{NS}$ and at least a receiving apparatus 100. The satellite signals used in the GNSS (Global Navigation Satellite System) are of the CDMA-type (Code Division Multiple Access). The satellite signals reception at the receiving apparatus 100 is implemented through the following, sequentially performed, standard steps: analog filtering, frequency conversion and digitization, acquisition, tracking, decoding and positioning.

The receiving apparatus 100 comprises an antenna 1, an analog receiving module AFE (Analog Front End), provided with a radiofrequency (RF) stage 2, and an analog-digital converter 3 (ADC), which can be implemented by hardware modules.

Further, the receiving apparatus 100 comprises a digital processing module DFE (Digital Front End), including an acquisition module 4 (ACQ), and a tracking module 5 (TRK).

Moreover, the receiving apparatus 100 is provided with a sub-frame recovery module (SBF-REC), an ephemerides processing and pseudo-range calculation module 7 (EPH-PSR), a satellites orbits prediction module 8 (ORB-PRE), a satellite type detecting module 9 (MOD-DET), a satellite position calculation module to (SAT-POS), and a user position calculation module 11 (USR-POS).

In some cases, acquisition module 4 and tracking module 5 can be implemented by hardware, while the remaining modules 6-10 can be implemented by software. In addition, it is observed that the acquisition module 4 and tracking module 5 can also be implemented by a hardware and software combination.

The receiving apparatus 100 is provided with a central processing unit, memories (mass memory and/or working storage) and respective interfaces (not shown in figures), comprising a microprocessor or microcontroller, for running the software resident in it.

SUMMARY

Embodiments of the present disclosure relate to a GNSS (Global Navigation Satellite System) receiver apparatus comprising a GNSS PRN delayed sequence generator, and related generation method. In particular embodiments refer to techniques for generating early and delayed replicas of a PRN (Pseudo Random Noise) sequence for the correlators of a tracking channel in such GNSS receiver apparatus.

Embodiments of the present disclosure can provide solutions that overcome one or more of the above drawbacks.

Embodiments of the present disclosure relate to a GNSS (Global Navigation Satellite System) receiver apparatus. The receiver comprises a tracking module comprising at least one tracking channel. The tracking channel comprises a bank of correlators receiving in-phase and quadrature versions of a received signal, a GNSS Pseudo Random Noise sequence generator generating a Pseudo Random Noise sequence at a code frequency set by a code Numerical Controlled Oscillator comprised in the tracking channel determining the code rate of the received signal, and a GNSS Pseudo Random Noise delayed sequence generator configured to generate, on the basis of a Pseudo Random Noise sequence received from the GNSS Pseudo Random Noise sequence generator, at least one punctual, one early and one delayed replica of the Pseudo Random Noise sequence. The GNSS Pseudo Random Noise delayed sequence generator comprises at least a first and second delay lines arranged as shift registers, comprising a determined number of flip-flops arranged in series and identifying taps at their output and the Pseudo Random Noise sequence being brought as input of the first register, taps of the registers being selected as early and delayed replicas of the Pseudo Random Noise sequence on the basis of selection signal issued by a control logic of the receiver wherein it comprises a circuit arrangement configured to generate an enable signal fed to an enable input of the flip-flops, the enable signal operating at a selectable enable frequency, the circuit arrangement being configured to select the enable frequency as equal or greater than the code frequency of the code Numerical Controlled Oscillator.

In variant embodiments, the circuit arrangement is configured to select the enable frequency as equal to or greater than the code frequency of the code Numerical Controlled Oscillator.

In variant embodiments, the circuit arrangement includes an edge detection module comprising a plurality of parallel branches, bit signals, corresponding to a Most Significant Bit and one or more of the following bits in significance ranking, taken at the output of the code Numerical Controlled Oscillator being supplied at the branch inputs of the edge detection module which are configured to generate a pulse aligned with an edge of the input bit signal. A multiplexer, which output is coupled to the input of the GNSS Pseudo Random Noise delayed sequence generator, selects the output of one of the branches as enable signal.

In variant embodiments, each branch of the edge detection module includes a negative edge detector circuit configured to generate a signal at the operating frequency, in particular supplied to advance the Pseudo Random Noise sequence generator if the branch is coupled to the bit signal derived from the Most Significant Bit, or at a multiple of the operating frequency if the branch is coupled to the bit signal derived from one or more of the following bits in significance ranking.

In variant embodiments, the circuit arrangement configured to generate an enable signal includes a second Numerical Controlled Oscillator which is controlled by the control logic by a specific frequency command to generate the enable signal at a determined frequency.

In variant embodiments, such specific frequency command is generated by the control logic which is coupled to a frequency setting logic which receives also a pulse generated by the code NCO to advance the Pseudo Random Noise sequence generator, the frequency setting logic being configured to synchronize the second frequency word with the pulse.

The present disclosure relates also to a method for the generation of a GNSS Pseudo Random Noise delayed sequence in a GNSS receiver apparatus according to any of the previous embodiments, which comprises generating an enable signal fed to an enable input of the flip-flops, the enable signal operating at a selectable enable frequency, selecting the enable frequency as equal or greater than the code frequency of the code Numerical Controlled Oscillator.

In variant embodiments, the method includes selecting the enable frequency as equal or greater than the code frequency of the code Numerical Controlled Oscillator.

In variant embodiments, the method includes changing the selectable enable frequency during the operation of the apparatus according to the operation phase of the apparatus or to change a spacing between the early and delayed replicas of the Pseudo Random Noise sequence.

The present disclosure relates also to a computer program product directly loadable into the internal memory of a digital computer, comprising software code portions for performing the steps of the method of any of the previous embodiments.

BRIEF DESCRIPTION OF THE DRAWINGS

Embodiments of the present disclosure will now be described with reference to the annexed drawings, which are provided purely by way of non-limiting example and in which:

FIG. 4 is a time diagram of signals obtained by a simulation;

FIG. 5A shows the correlation power of signals and FIG. 5B shows a logic correlation point diagram;

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The following embodiments are described in a non-limiting way referring to the GPS technology. However, the teachings of the present disclosure can be applied also to other satellite positioning systems.

Figure 1:
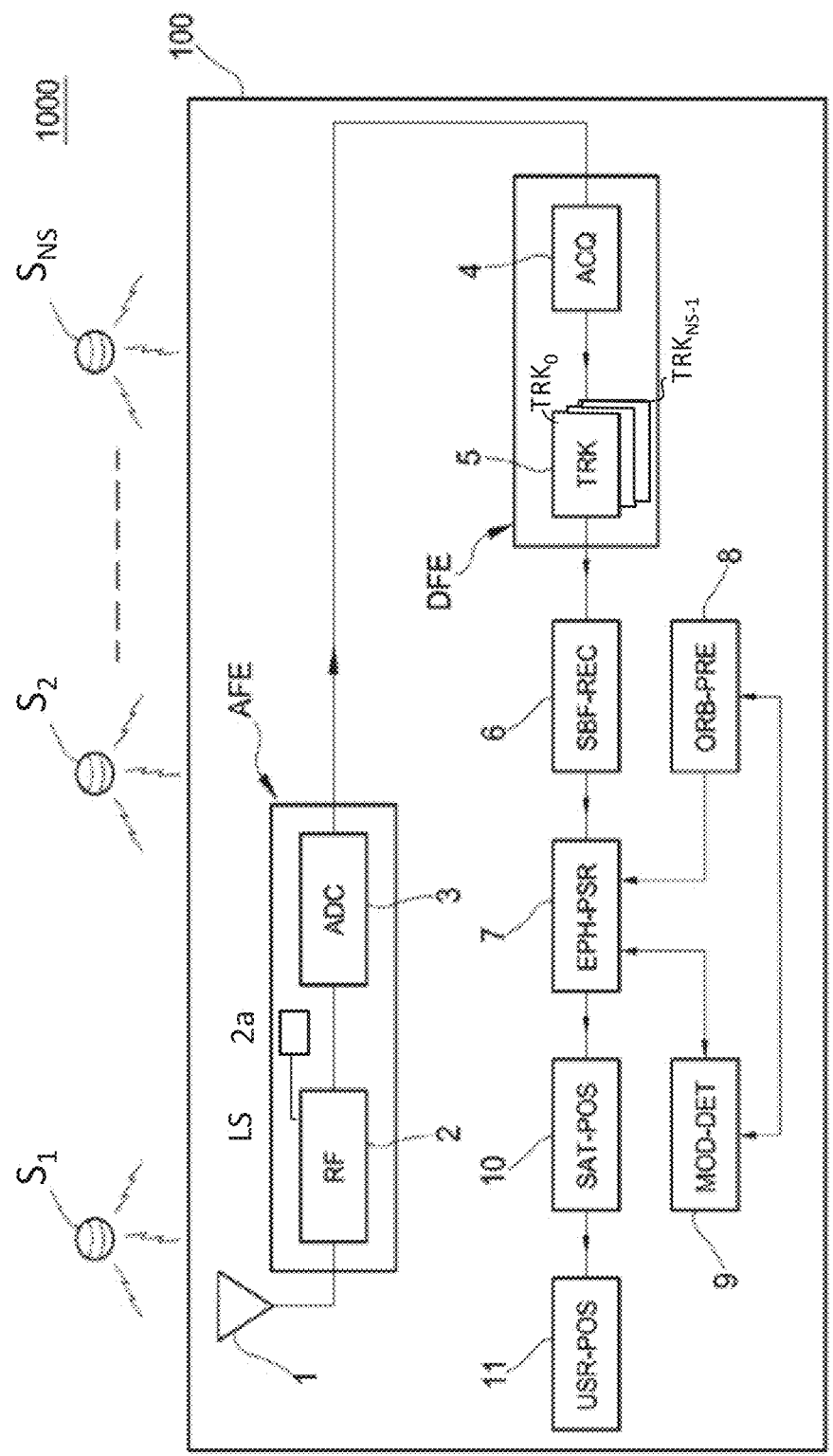
FIG. 1 diagrammatically shows a GNSS (Global Navigation Satellite System) system.

When the receiving apparatus 100 of FIG. 1 operates, an antenna 1 receives a plurality of signals from one or more satellites $S_1$-$S_{NS}$ of the constellation of satellites operating in system 1000. For example, these signals can be modulated on a carrier having a frequency of about 1.5 GHz. In particular, each received signal transports a pseudo-random code and a message for the data communication.

The pseudo-random code, known as CA code, for example at 1 MHz, is used for distinguishing a satellite from another, and enables the receiving apparatus 100 to measure the time instant at which has been transmitted a signal by a corresponding satellite. Pseudo-random code is implemented by a sequence of pulses, called chips.

The radio frequency stage 2 operates on the signals received by antenna 1 (of the analog type) and converts them to the base band or to an intermediate frequency. Analog-digital converter 3 converts the intermediate frequency signals to corresponding digital signals. The radio-frequency stage 2 operates the conversion at an intermediate frequency using the frequency of a local signal LS by a Temperature Compensated Crystal Oscillator (TCXO) 2a.

The acquisition block 4 identifies in the digital signals originated by the analog-digital converter 3 the satellites in visibility, testing their presence by trying to match their transmitted PRN (Pseudo Random Noise) code sequence, i.e., the CA code, with a corresponding local replica and when a peak confirmation is found provide the initial GNSS information, i.e., code/frequency information to an elementary Intermediate Frequency tracking correlation block. Further, the acquisition module 4 detects a plurality of parameters associated to the satellites and used for time tracking the satellite.

The data navigation message transports data (for example at a bit rate equal to 50 Hz) and particularly is modulated based on the Binary Phase Shift Keying (BPSK) technique. Further, data navigation message is hierarchically divided in frames and sub-frames and transports several information, among them a plurality of parameters used for determining the orbit and consequently the position of satellites.

The tracking module 5 has plural channels, indicated by a channel index i from 0 to NS−1, in particular indicated as $TRK_0 \ldots TRK_{NS-1}$ and each is allocated to a different satellite. Specifically, the tracking module 5 is configured to operate as a frequency locked loop. Based on a further embodiment, tracking module 5 is configured to implement a phase locked loop.

The tracking module 5 is configured to supply data to the sub-frame recovery module 6, as a time sequence of samples pairs, indicated with {I, Q}. Each sample {I, Q} is for example the result of a coherent integration, respectively in-step and quadrature, of a bit of 20 msec, performed by a correlator based on the modulation technique Binary Phase Shift Keying (BPSK), each samples pair {I, Q} represents a transmitted bit.

As it is known in the field of the digital communication theory, each sample {I, Q} can be further interpreted as a phasor, by considering the value I and value Q as the real and imaginary parts of a bi-dimensional vector in the complex Cartesian plane.

Moreover, for each satellite, in the tracking module 5 the Doppler frequency and the transfer time of the GPS signal transmitted by a satellite $S_1$-$S_{NS}$ are determined.

The sub-frame recovery module 6, by means of suitable algorithms, decodes the different received sub-frames forming the navigation data message. The ephemerides processing and pseudo-range calculation module 7 stores the satellite orbit, as ephemerides data and calculates the existent distances between the satellites and receiving apparatus 100: such distances are called pseudo-range. By these calculated values, and the time for transferring the GPS signal, the satellite position calculation module to calculates the positions of the satellites expressed by 3D coordinates, at the moment of transmission.

The satellite orbit prediction module 8 can be activated for assisting the ephemerides processing and pseudo-range calculation module 7 and/or satellite position calculation module 10 when the ephemerides data are not available at the receiving apparatus 100.

The satellite type detecting module 9 is configured to determine the type of the tracked satellite and by it the solar radiation pressure model to be used in the orbit prediction by the satellite orbit prediction module 8, according to modes that will be described in the following as examples. The satellite type detecting module 9 enables to determine the type of satellite in order to select the solar radiation pressure model which better provides for the shape, mass and size of a satellite.

In this embodiment, the satellite position calculation module to operates on the time for transferring the GPS signal together with the reception time (known due to a clock inside the receiving apparatus 100). The satellite position calculation module to operates in order to evaluate how much time is required to the signal from each satellite for reaching the receiving apparatus 100, evaluating in this way the distance from the corresponding satellite (pseudo-range).

By a triangulation algorithm, the user position calculation module 11 calculates the position of the receiving apparatus 100 based on the distances of the receiving apparatus 100 preferably from at least four satellites and based on the positions of the same satellites, known at this processing stage. In the following, the position of the receiving apparatus 100 (practically coinciding with the user position) will be called "fix".

As mentioned, the tracking module 5 includes a plurality of channels, i.e., tracking correlation blocks which are usually let working in parallel each tuned on a different satellite PRN code and frequency, among the ones previously identified by the acquisition block 4, with the goal to confirm or eventually discard the acquisition hypothesis for every of them. For the confirmed satellites, after a startup refinement of the code and frequency initially provided by the acquisition block, the stable locked tracking phase starts. It consists into tightly following both the frequency offset (velocity) and the code phase (distance) of the satellite vehicle being analyzed and to demodulate the position and time information embedded in its bit stream. These information are then provided to a Kalman Filter to triangulate the receiver position.

The tracking channel as mentioned includes a correlator which comprises a PRN (pseudorandom noise) delayed sequence generator. The GNSS signals received at the receiver includes a ranging code modulated into the carrier, also called Pseudo-Random Noise (PRN) code, which spreads the spectrum and allows retrieving ranging information. Therefore it required that the tracking channel include a PRN delayed sequence generator, which generates PRN sequence which are early, punctual or delayed one with respect to the other to perform correlation with the ranging codes.

Since in current receivers the number of tracking channels is greatly increased to improve the precision performances and support new system, the number of PRN delayed sequence generator is correspondingly increased. This may create problems in terms of silicon area occupied on the chip.

Figure 2:
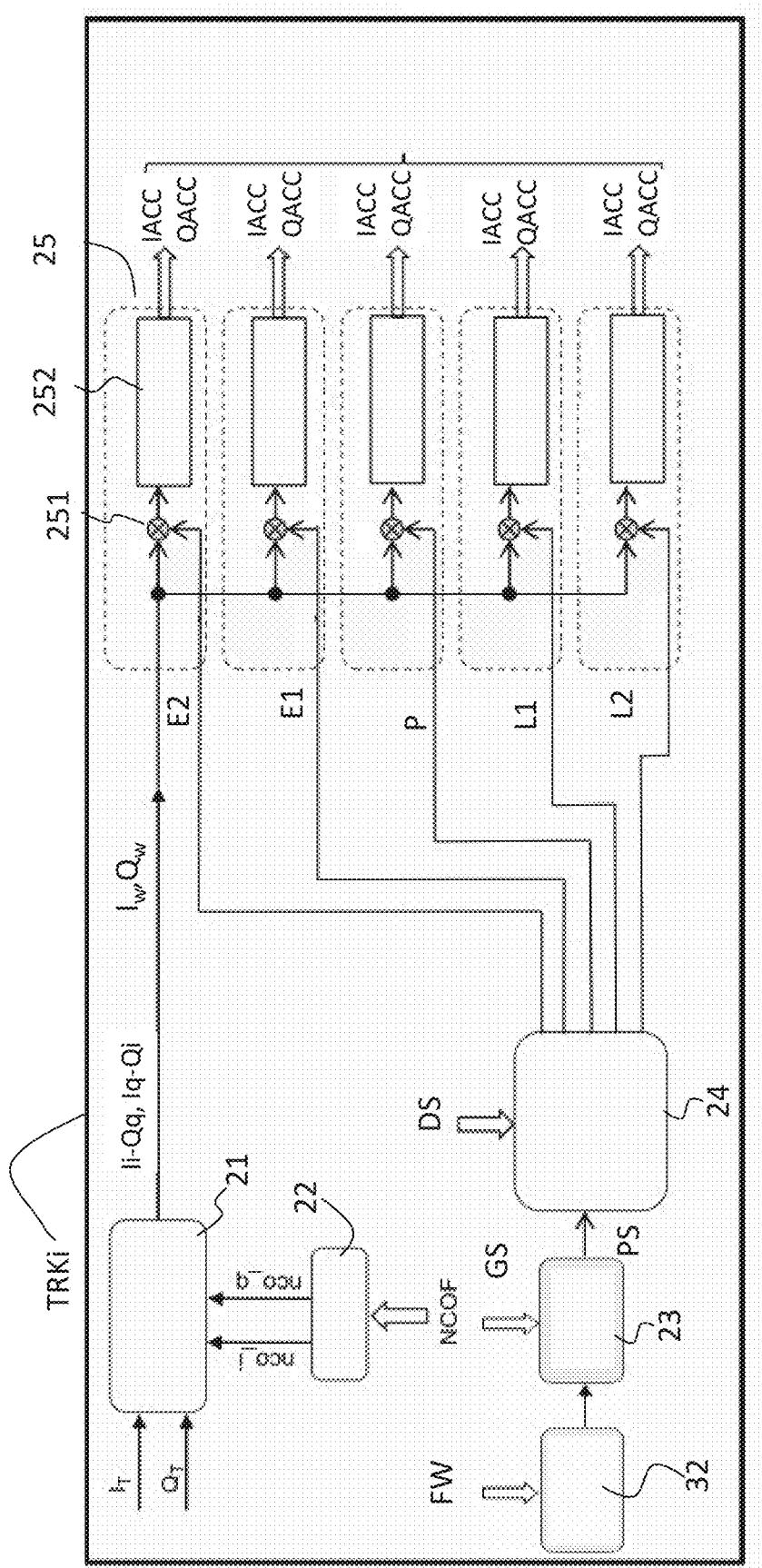
FIG. 2 schematically shows a tracking channel comprising an embodiment of a GNNS PRN delayed sequence generator.

In FIG. 2 it is shown schematically a tracking channel TRKi comprising an embodiment of a GNNS PRN delayed sequence generator 20. The GNNS PRN delayed sequence generator 20 basically comprises a GNSS PRN sequence generator 23 and a delayed sequence generator 24. A code Numerical Controlled Oscillator 32, NCO in the following, is also provided which is programmed to generate the Pseudo Random Noise, PRN in the following, code rate. For example for GPS the code rate is Fchip=1.023 MHz. Such code NCO 32 receives a frequency word FW, setting the code rate Fchip, and a clock signal CK from the AFE stage 2.

More in detail, baseband in-step $I_T$ and quadrature $Q_T$ components of the GNSS signal received enter a module 21 configured to remove the frequency Doppler. Such module 21 to this regard receives from a carrier NCO (Numerical Control Oscillator) 22 respective in-step and quadrature frequencies nco_i and nco_q, generated by the carrier NCO 22 under the control of a NCO drive frequency NCOF, which corresponds to the receiver generated carrier. Module 21 therefore generates an in-step wiped component $I_W$ and a quadrature wiped component $Q_W$ of the GNSS received signal where the frequency Doppler (a Doppler Effect frequency offset caused by the reciprocal motions of the satellite and the receiving apparatus) is removed, i.e., wiped, which are brought as input to a bank of correlators 25 arranged in parallel, each of which receives at another input a delayed, punctual or early version of the PRN code generated by a delayed sequence generator 24. Specifically, in the example shown there are five correlators, $25_1$, $25_2$, $25_3$, $25_4$, $25_5$, which receive at one input the wiped components $I_W$,$Q_W$ and at the other input respectively a further early signal E2, an early signal E1, a punctual signal P, a late signal L1, a further signal L2, which correspond to time-shifted replicas of the PRN code signal, shifted, as shown in the time diagram of FIG. 4 or 10, of a given interval of time one with respect of the other, starting from signal E2, which is early by two intervals of time with respect to punctual signal P, and arriving to signal L2, which is late by two intervals of time with respect to punctual signal P, which in general corresponds to the so-called Prompt code. Although the example shown refers to K=2 early and late sequences, the value K can be different, one or greater than two.

With the reference number 23 is then indicated a GNSS PRN generator, which receives setting GS and generates a GNSS PRN sequence PS, i.e., PRN codes. The setting GS to originate a given PRN sequence PS are supplied by the acquisition side in the analog receiving module AFE along with the starting phase. The PRN sequence PS is brought as input to the GNSS PRN delayed sequence generator 24 which outputs signals E2, E1, P, L1, L2.

Each correlator includes a multiplier 251, which receives the two inputs from the module 21 and PRN generator 24, and supplies the sum at its output to a respective accumulator register 252, e.g., an integration and dumping block, which accumulates over an accumulation time of the correlator 25, and supplies accumulated in-step $I_{acc}$ and quadrature components $Q_{acc}$, which are supplied to a receiver processor to evaluate the result of the correlation and to find the correlation peaks. These techniques and the techniques employed to process the accumulated in-step $I_{acc}$ and quadrature components $Q_{acc}$ are known per se to the person skilled in the art and would not be further discussed in detail. Thanks to the correlation result with the PRN sequence advanced and delayed versions, the receiver is able to maintain a stable satellite tracking and get an high accuracy by using a discriminator algorithm.

As mentioned, in FIG. 4 it is shown the time diagram of the outputs signals E2, E1, P, L1, L2, while in FIG. 5A it is shown the correlation power, in absolute value, as a function of the normalized code phase of the E2,E1,P,L1,L2 signals. The dotted line represents the tracking correlation curve. The idea is to sample the tracking correlation curve in the right position by the 2K+1 correlation point (5 in this example, with K=2, i.e., E2,E1,P,L1,L2 signals).

Figure 3:
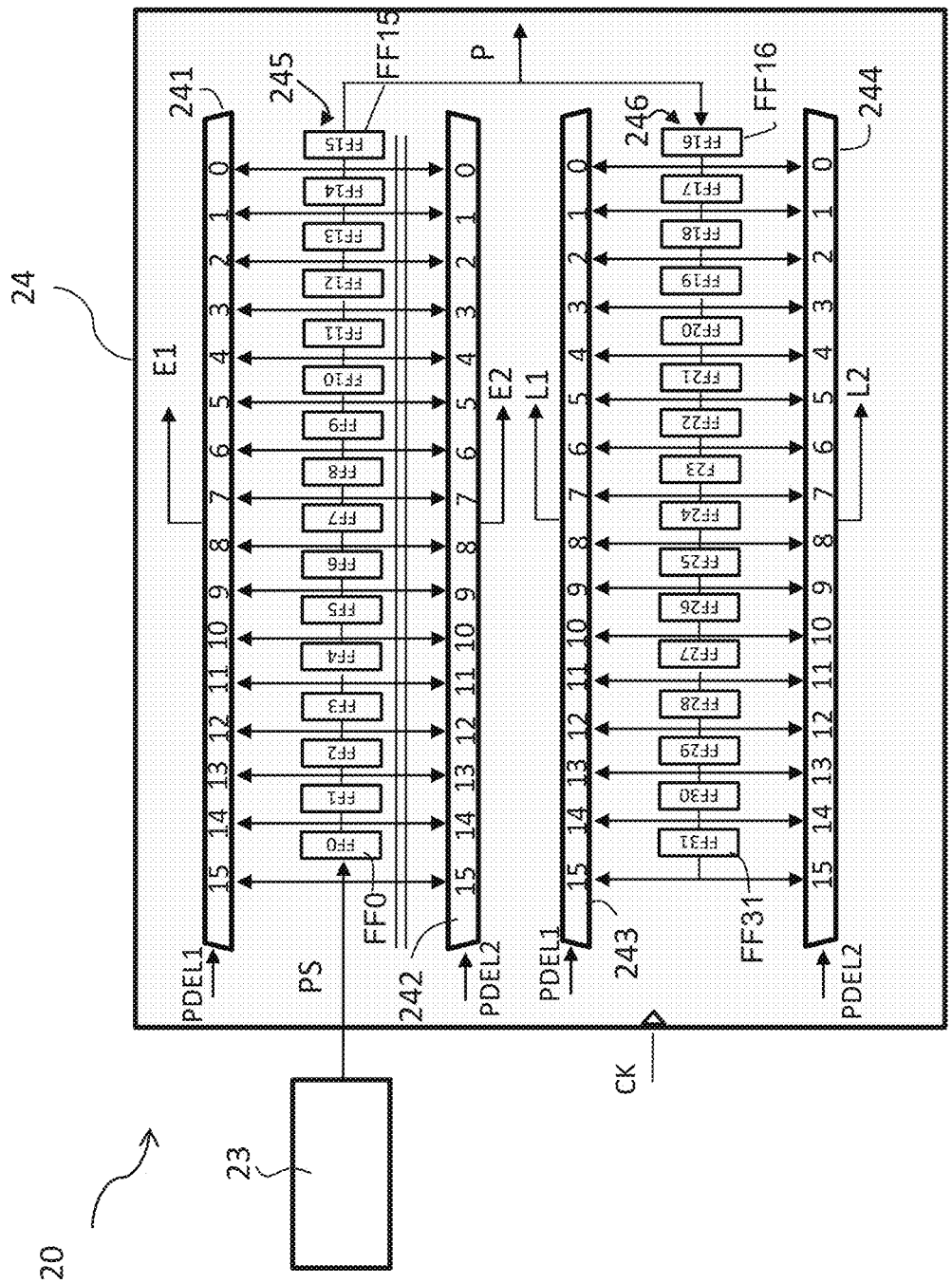
FIG. 3 shows a delayed PRN generator, which includes a first delay line obtained by a shift register.

In FIG. 3 it is shown the delayed PRN generator 24, which includes a first delay line obtained by a shift register 245 comprising a plurality of N delay flip-flops, specifically 16 flip-flops FF0 . . . FF15, defining corresponding taps at each flip flop output. The PRN sequence PS is brought as input of the shift register 245, to the first flip-flop FF0. The taps are brought as input of a first multiplexer 241 which operates under the control of a first delay selection signal PDEL1 to output the early signal E1 and as input of a second multiplexer 242 which operates under the control of a second delay selection signal PDEL2 to output the further early signal E2. At the output of the shift register 245 is taken the punctual signal P, which is also brought as input to a second delay line obtained by a second shift register 246, with the same number of flip-flops of the shift register 245. The taps are brought as input of a third multiplexer 243 which operates under the control of the first delay selection signal PDEL1 to output the late signal L1 and as input of a fourth multiplexer 244 which operates under the control of the second delay selection signal PDEL2 to output the further late signal L2. Flip flop are clocked at fixed frequency, by a clock signal CLK in input to module 24. The first and second delay selection signals PDEL1-PDEL2, by defining the output tap of the multiplexers, define the advance and the delay of the signals representing the replica of the sequence PS. For instance PDEL1=1 and PDEL2=9, so to space the signals E2-E1 and L1-L2 of 8*Tck, Tck being the clock period.

As shown in FIG. 5B, which shows a logic correlation point diagram, i.e., the power value ($I^2+Q^2$) of the correlation between the sequence E2,E1,P,L1,L2 and incoming signal from the block 252 (in practice it is a sampling of the ideal tracking correlation curve at certain code delay T according to the settings), a maximum spacing SM between signal E2 or L2 and signal P is fixed and equal to 16*(1/Tck), thus the spacing between signal E2 and L2 is fixed and equal to 32*(1/Tck).

This solution is not very flexible with respect to clock frequency variation. If the frequency clock Fck passes from Fck to 4Fck for instance (for example from 16Fchip, where Fchip is the code rate, to 64Fchip where Fchip=1.023 MHz in GPS), in order to have the same maximum spacing SM between signals E2 and L2, it is necessary to increase the number of flip flop by a factor 4. Then to operate at 16Fchip with the same structure it should be necessary to add additional multiplexers to select the proper taps as outputs. In conclusion such solution leads to remarkable space consumption on the chip.

Figure 6:
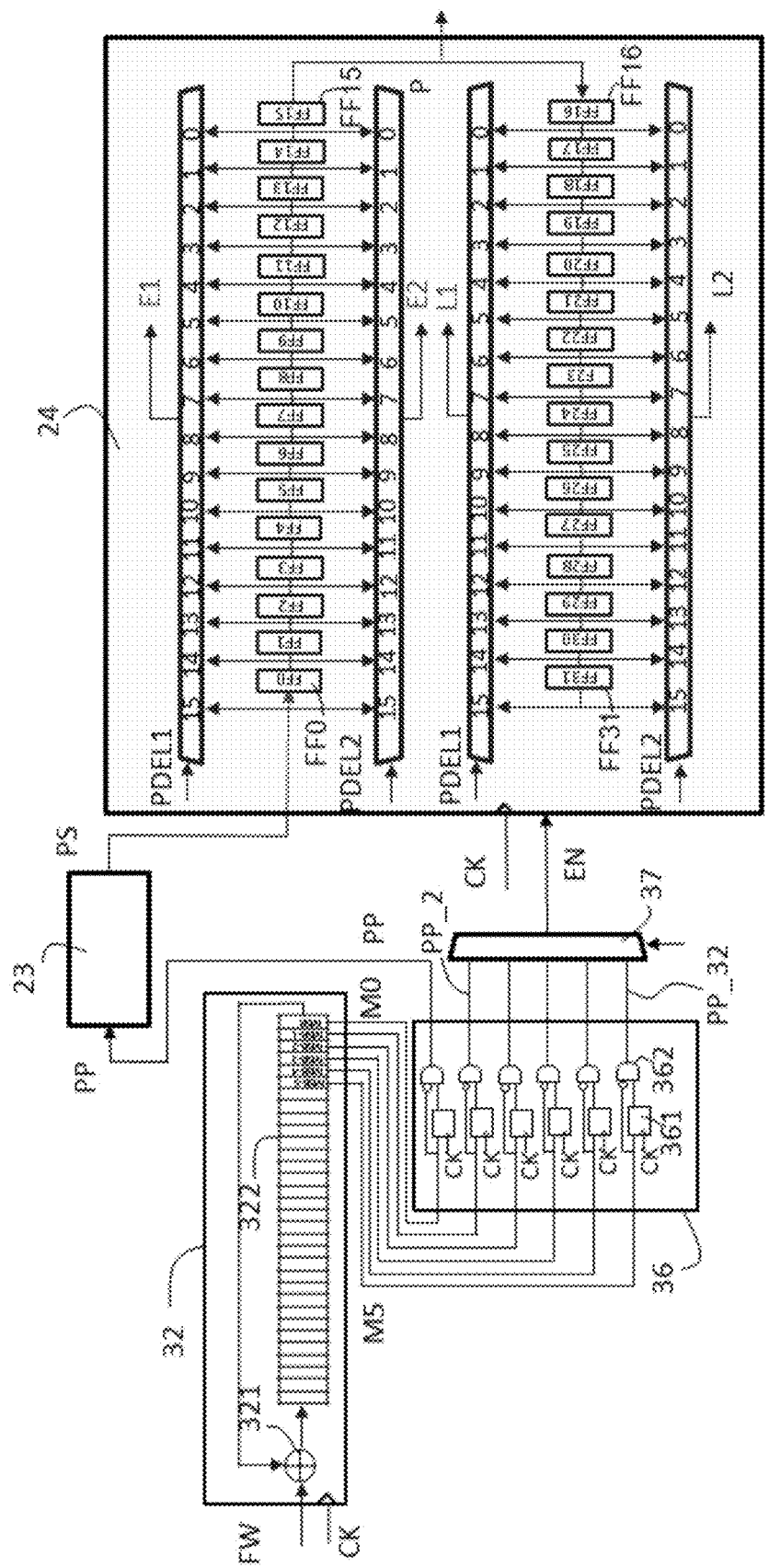
FIG. 6 is a schematic diagram of an embodiment of the solution here described.

FIG. 6 shows an embodiment of the solution here described. As it can be seen the GNSS PRN delayed sequence generator 20 is the same of the solution shown in FIG. 4. However, the GNSS PRN sequence generator 23 which supplies the PRN sequence PS to the delayed sequence generator 24 receives as setting GS a shift pulse PP, which is a pulse that makes the PRN sequence generator 23 advance.

As shown the code Numerical Controlled Oscillator 32, NCO in the following, is provided which is programmed to generate the Pseudo Random Noise, PRN in the following, code rate. For example for GPS the code rate is Fchip=1.023 MHz. Such code NCO 32 receives a frequency word FW, setting the code rate Fchip, and a clock signal CK from the AFE stage 2. The code NCO 32 includes an accumulation register 322 which output is fed back to a summator 321 to be summed with the frequency word FW. The output of the summator 321 is fed to the input of an accumulation register 322, which is in the example a 32 bit shift register. The shift pulse PP is obtained by detecting the negative front of a MSB (Most Significant Bit) bit of the code NCO accumulation register 322, which by definition is a pulse waveform at code rate frequency Fchip. This is performed in a negative edge detector module 36, which includes a plurality of branch in parallel including each a negative edge detector circuit, comprising a delay flip flop 361, clocked by clock signal CK, receiving a bit signal among signals taken from n+1 consecutive taps of the register 322, starting from the MSB taps, e.g., signal M0, M1 . . . Mn corresponding to MSB, MSB-1 . . . MSB-n, from the NCO accumulation register 322 and supplying its output to an input of a AND gate 362, to which other, negated, input, is brought the bit signal M0 . . . Mn.

Figure 7:
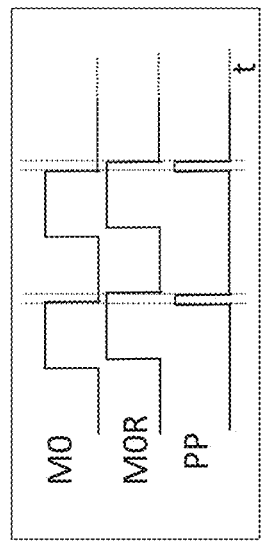
FIG. 7 is a time diagram of signals formed in the embodiment of FIG. 6.

As shown in FIG. 7, which shown the signals of the detector 36 in function of time t, in each branch the AND gate 362 receives the MSB signal M0 (or M1 . . . Mn) and a delayed bit signal MR, which is the bit signal delayed from the D-flip flop, outputting the shift pulse PP if M0 is used, or pulse signals PP2 . . . PP2*(n+1), in the example PP2 . . . PP32, which are at frequency 2*Fchip to 32*Fchip depending on the bit signal M1 . . . Mn originating it.

Thus there are n+1 parallel branches, in the example n=5 and there are six branches, which at their outputs supply pulses at different chip frequencies, multiple one with respect to the other. The branch of the detector 36 which receives the MSB bit signal M0 as input outputs the shift pulse signal PP at frequency Fchip. The other branches respectively outputs pulse signal PP2 . . . PP32 at frequencies 2Fchip, 4Fchip, 8Fchip, i6Fchip, 32Fchip.

The shift pulse signal PP as mentioned is fed to the PRN sequence generator 23, while the multiple frequency pulse signals, PP2 . . . PP32, are supplied to a multiplexer 37, which selects one of these multiple frequency pulse signals as enable signal EN. The enable signal EN is supplied to the delayed sequence generator 24 as enable signal of the flip-flops FF0 . . . FF15,FF16, . . . FF31 of the registers 245-246. Thus, in the same way of MSB, deriving the bit signal M1 . . . Mn, M1 . . . M5 in the example, are obtained enable signal pulse for the delay sequence generator 24 than can work in this way at frequency multiple of the code rate frequency Fchip, 2*Fchip, 4*Fchip, 8*Fchip, 16*Fchip, 32*Fchip.

Figure 8:
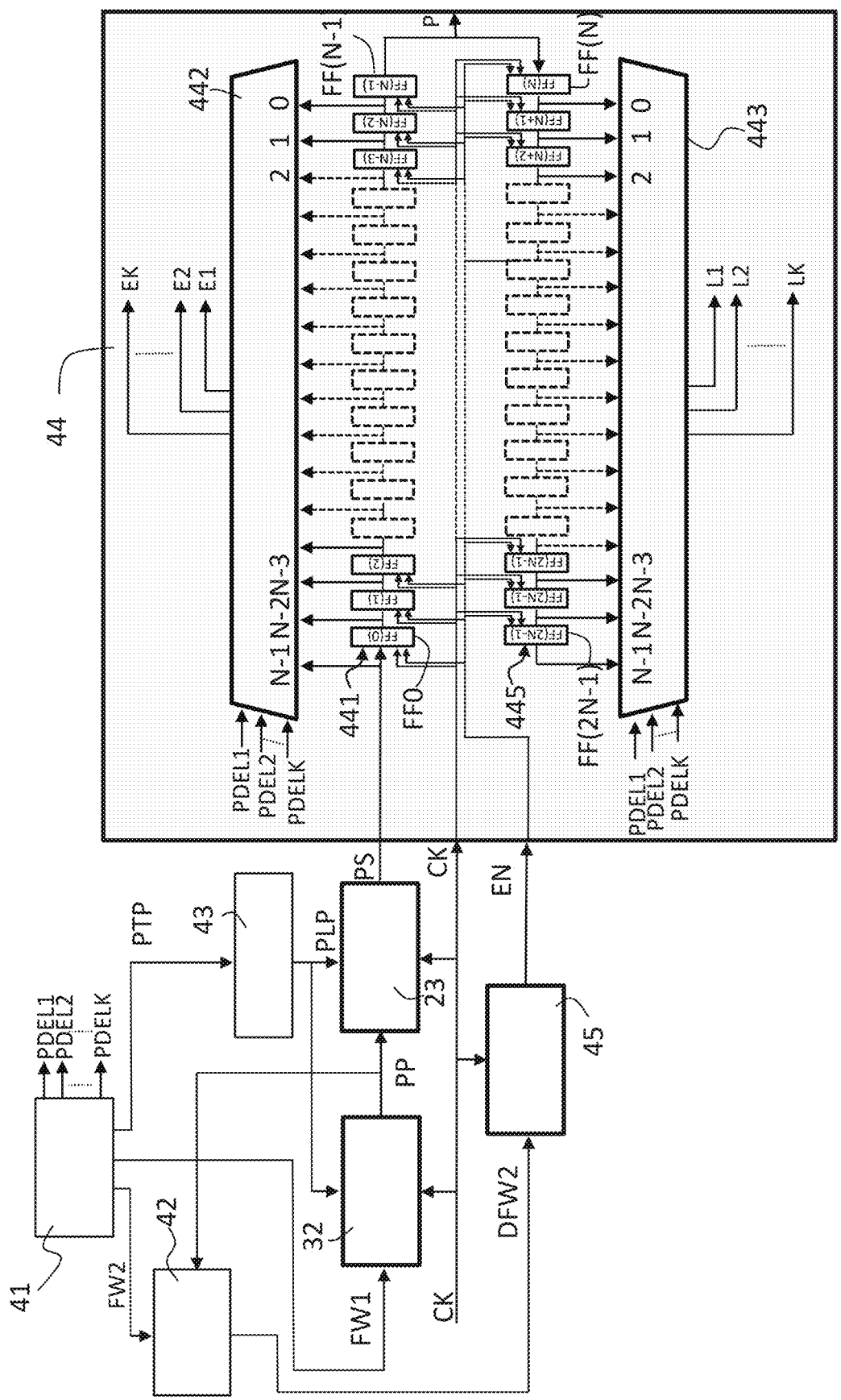
FIG. 8 is a schematic diagram of a further embodiment of the solution here described.

The solution here described by selecting through a selection signal of the multiplexer 37 one among the output of the edge detector 36 can determine an enable rate which can vary in a fixed range of value, e.g. 2*Fchip, 4*Fchip, 8*Fchip, 16*Fchip, 32*Fchip In FIG. 8 it is shown a further embodiment, which uses a further NCO to generate the enable signal EN for the delayed sequence generator.

In FIG. 8 it is thus shown a GNSS PRN sequence delay generator 44 which can use 2*K+1 correlation points (in FIG. 6 was K=2, i.e., 5 correlation points). The GNSS PRN sequence delay generator 44 has the same structure with two registers and two multiplexers for selecting the taps of generator 44, however the size of the registers and consequently of the multiplexers is different. Therefore shift registers 441 and 445 are provided, each with a number N of flip-flops so that the 2*K signals corresponding to the 2*K correlation points (2*K+1 considering the punctual sequence P) can be extracted from the associated multiplexers, an early decode multiplexer 442 supplying as outputs early signals E1 . . . Ek spaced of a increasing time advance, and a late decode multiplexer 443 supplying as outputs late signals L1 . . . Lk spaced of a increasing time delay.

Like generator 24 the GNSS PRN sequence delay generator 44 receives the clock signal CK and the enable signal EN which are fed to the D-flip flops of registers 441 and 445.

A software module 41, i.e., a control logic module of the receiver, which can also be the same module issuing the signal GS and the selection signal of multiplexer 37, issues the K delay selection signal PDEL1 . . . PDELK and a PRN starting phase signal PTP for a PRN starting pulse generation module 43 which generates a PRN load pulse controlling the generator 23.

The software module 41 issues a first frequency word FW1 and a second frequency word FW2. The first frequency word FW1 as in the embodiment of FIG. 6 is sent to the code NCO 32 which generates the shift pulse PP which is brought as input of the PRN sequence generator 23.

The second frequency word FW2 generated by the software module 41 is received by a frequency setting logic 42 which receives also such shift pulse PP generated by the code NCO 32 and generates a delayed frequency word FW2 which is brought as input of a NCO delay sequence module 45, which generates the enable signal EN. Although the NCO delay sequence module 45 has a structure corresponding to that of NCO 32 shown in FIG. 6, e.g., an input summator summing the frequency word and the output, i.e., the MSB, of a shift register. Blocks 23, 32 and 44 receive the clock signal CK, which is brought also to the NCO delay sequence module 45, to clock the shift register.

The software module 41, as mentioned, issues a starting phase PTP value in order to start the PRN generator 23. This starting phase PTP value is sent to the starting pulse generation module 43 which is configured to, when the time base corresponds to such starting phase PSP value to issue the PRN sequence load pulse PLP, which is sent to reset the code NCO 32, programmed to operate at the frequency indicated by the first frequency word FW1. In the same time the PRN sequence load pulse PLP is sent to the PRN sequence generator 23 which begins to output the PRN sequence PS under the control of the shift signal PP at the code rate Fchip, e.g., the rate of the code to be generated.

Figure 9:
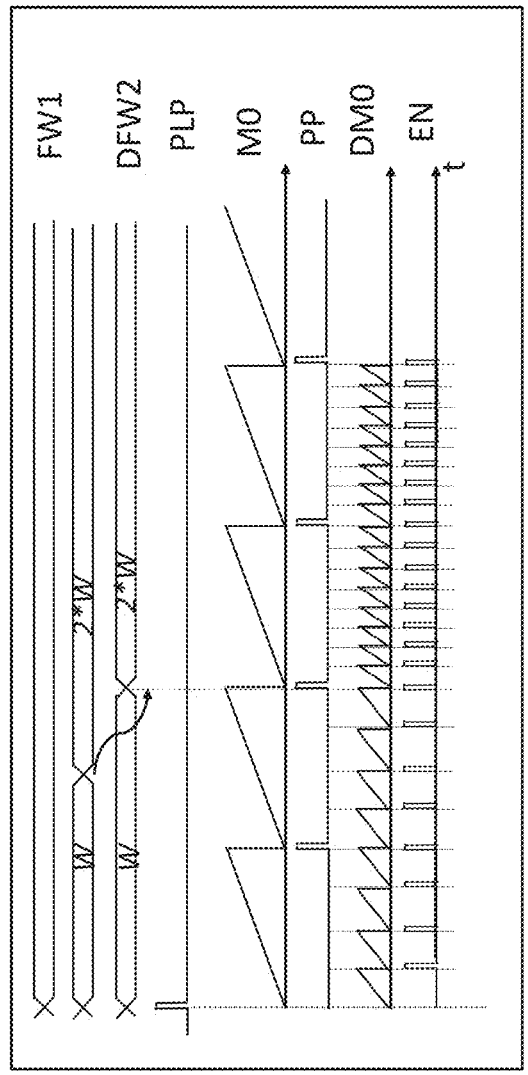
FIG. 9 is a time diagram of signals formed in the further embodiment of FIG. 8.

In FIG. 9 it is shown instead a logic time diagram where are reported the signals used to generate the EN signal, in particular in the solution of FIG. 8.

In the diagram of FIG. 9 the origin of the time axis, e.g., time zero, corresponds to the instant in which the load pulse PLP is issued, i.e., the time corresponding to the starting phase PTP indicated by the module 41. The first frequency word FWx is set to a value corresponding to the code rate Fchip.

The software module 41 is configured to program the rate of the enable signal EN with which is desired to operate the delayed sequence generator 44. This is performed by setting a second frequency word FW2 of a value corresponding to the rate to be set, e.g., the value of Fchip if the delayed sequence generator 44 operates at code rate frequency, i.e., the enable signal is at code rate frequency Fchip, or a higher value if the generator 44 is to be operated with an enable signal EN with such higher value. It is underlined that in this embodiment such values are not necessarily multiples of the code rate frequency Fchip, differently from the embodiment of FIG. 6. The enable signal EN, as shown in FIG. 9, is a sequence of pulses which makes the delay line obtained by the shift registers 441, 445 advance with the rate of the enable signal EN, e.g., the inverse of the time interval between the pulses of the enable signal EN.

In particular as shown in the diagrams of FIG. 9, after the issuance of the load pulse PLP which starts the PRN sequence PS, the NCO 32 is reset and starts accumulating. In FIG. 9 is shown the evolution of the MSB M0. When the MSB M0 reaches the maximum a shift pulse PP at code rate frequency Fchip is issued, in the same way described with reference to FIGS. 6 and 7.

The diagrams of FIG. 9 shows also the accumulation signal DM0, of the NCO delay sequence module 45, e.g., the accumulation register of the NCO delay sequence module 45, which is driven by the delayed second frequency word DFW2, which relationship with respect to the second frequency word FW2 is better explained below. As shown, the second frequency word FW2 sets initially a frequency in the example which is four time the frequency of the first word FW1, e.g., four times Fchip.

Each time the accumulation signal DM0 reaches the maximum an enable signal pulse EN is issued, the frequency corresponding thus to that of delayed second frequency word DFW, in the example 4*Fchip.

The software module 41 by programming the signal PDELK sets the spacing of the sequences EK and LK which are in advance and delayed with respect to the punctual PRN sequence P.

The software module 41 to change the rate of the enable signal EN, for instance doubling the rate, as shown in FIG. 9, issues a new value of second frequency word FW2, indicated with 2*W in the figure since is a frequency value two times the value W set initially at the issuance of the load pulse PLP starting the PRN sequence PS.

To maintain the synchronism with the code, the update of the second frequency word FW2 is performed through the Frequency Setting Logic 42, which receives the shift pulse PP and uses it to synchronize the second frequency word FW2 from module 41 obtaining the delayed frequency word DFW2, synchronized to the shift pulse PP, as shown in FIG. 9.

When the NCO delay sequence module 45 receives the delayed frequency word DFW2, the accumulation signal DM0 changes accordingly, i.e., doubles the frequency, and the enables signal EN frequency is doubled as well.

AS mentioned the second frequency word FW2 determines an accumulation signal DM0 which goes 4 time faster in the first case and eight time faster in the second. Therefore the enable signal EN in the first case is a pulse with a 4*Fchip frequency, in the second a 8*Fchip frequency signal.

The embodiment described with reference to FIG. 8 allows to have a rate of the enable signal EN which is programmable by an NCO. The delay sequence generator 44 in this way can work at variable frequency and the software module 41, e.g., a software application run by a processor module, can decide to change it dynamically according to the different needs of the receiver, such as start tracking, stable tracking, use of tracker as acquisition and other operation phases. As mentioned the number of flip-flops in each of the delay line implemented by the shift register 441, 445 and the number K of delayed and advanced PRN sequence selected by multiplexers 442, 443 can be decided according to the design needs.

Figure 10:
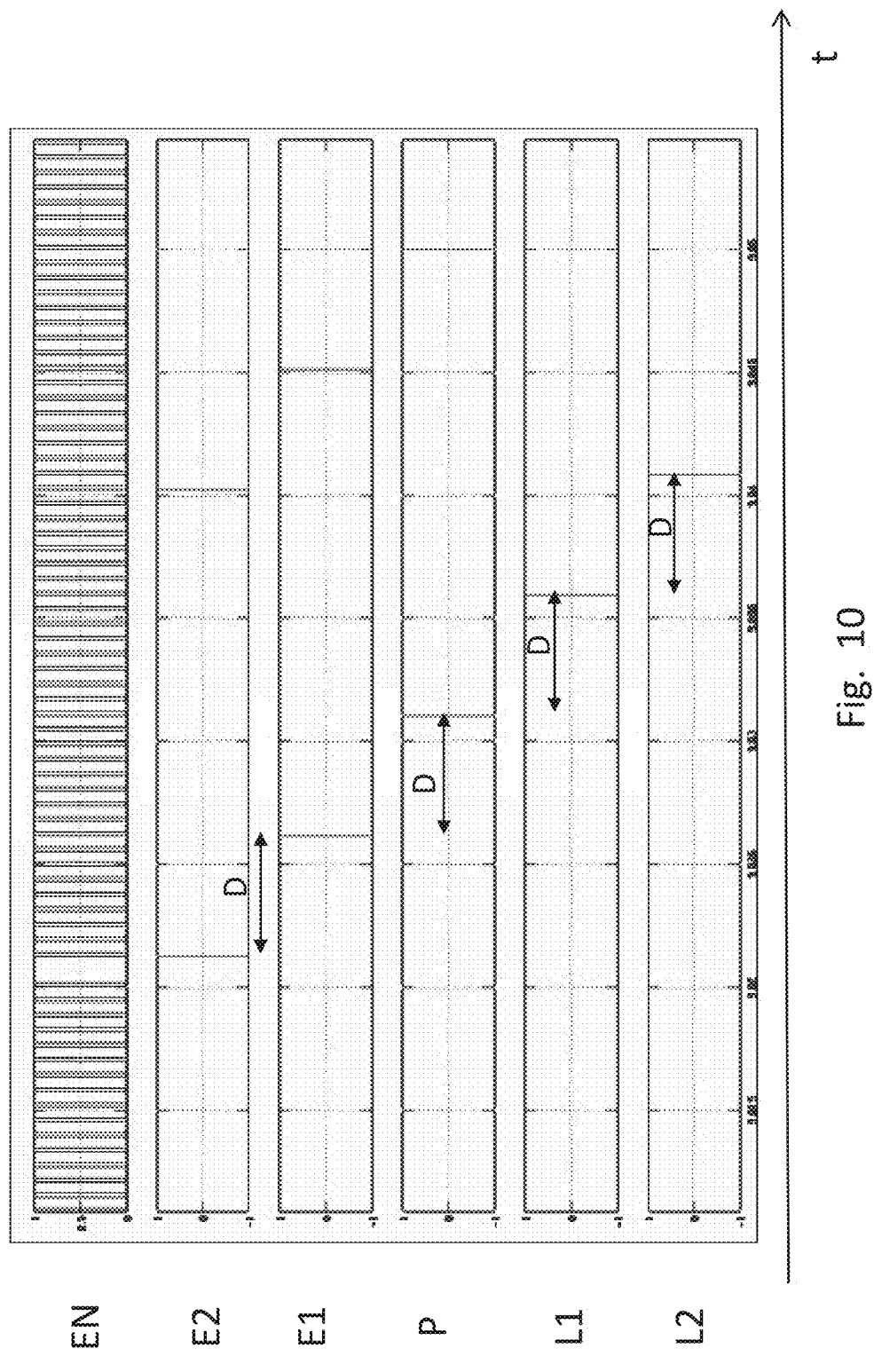
FIG. 10 is a time diagram of signals obtained by a simulation of the solution here described.

In FIG. 10 it shown a time diagram representing the signals entering the delayed sequence generator with K=2. Thus are shown the enable signal EN and signal E2, E1, P, L1, L2. The number of flip-flops N is 16 and the first delay selection signal PDEL1 is equal to the second delay selection signal PDEL2, in particular is value is 8, this meaning that a delay D of 8*(1/T_en) where T_en is the period of the enable pulse of the enable signal EN supplied to the delay sequence generator 24 or 44.

Figure 11:
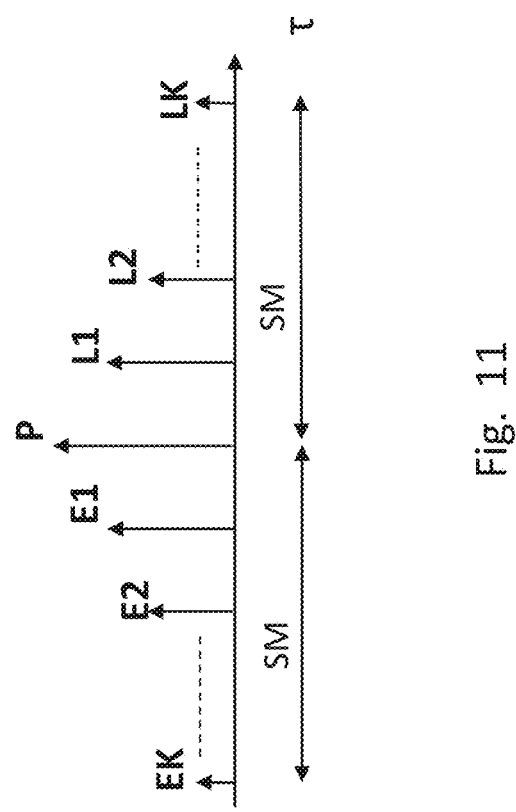
FIG. 11 is a logic correlation point diagram pertaining signals of the further embodiment of FIG. 8.

In FIG. 11, similarly to FIG. 5B is shown a logic correlation point diagram, i.e., the power value $(I\hat{}_2+Q\hat{}_2)$ of the correlation between the sequence Ek . . . E2,E1,P,L1,L2 . . . Lk and incoming signal (output of 252). In practice it is a sampling of the ideal tracking correlation curve at certain code delay according to the settings.

The maximum spacing between signals E2 and L2 is not fixed and equal in the example at 16*(1/T_en), instead of the fixed value 16*(1/Tck) like in the example of FIG. 5B. In other words by changing the period of the enable signal EN T_en, e.g., the frequency of the enable signal EN, it is possible to zoom in or zoom out across the tracking peak.

More in general, the maximum spacing SM between signal EK and LK is SM=N*(1/T_en). The enable period T_en is the inverse of a frequency FNDCO of the signal outputted by the delayed NCO 45, i.e., T_en=1/FDNCO. Then: $FDNCO=DFW2*Fclk/2^{NA}$.

The frequency FNDCO of the delayed NCO 45 therefore is equal to the frequency clock value multiplied by the frequency value set by the second frequency word FW2 divided by two to the power of an accumulator bit number NA of the delayed NCO 45.

The solutions disclosed herein have thus significant advantages with respect to the known solutions.

The solutions just described are very flexible versus clock frequency variation. If the frequency is increased, there is no need to increase the number of flip-flops, since the solutions is configured to change simply the frequency of the enable signal instead, thus sparing area on the chip.

Of course, without prejudice to the principle of the invention, the details of construction and the embodiments may vary widely with respect to what has been described and illustrated herein purely by way of example, without thereby departing from the scope of the present invention, as defined by the ensuing claims.

The receiver apparatus preferably includes a circuit arrangement which is configured to select the frequency of the enable signal, in one or more embodiment its greater than the code frequency Fchip of the code NCO, in particular as multiple by 2, 4, 8, 16, 32 of it, while in other embodiments the frequency of the enable signal can be set at any value. Thus in the embodiment of FIG. 6 the selectable frequencies are multiples of the code frequency, while the embodiment of FIG. 8, in order to have the receive apparatus performing the tracking is configured to set the frequency of the enable signal with any value which is allowed by the setting of the delayed frequency word DFW2.

While in tracking operations the frequency of the enable signal may be set as greater than the code frequency, the embodiment of FIG. 8 can be configured, in particular programmed through the delayed frequency word, to set an enable frequency of the enable signal which is different, e.g., lower than the code frequency for different modes of operation of the tracking module in the receiver, for instance the frequency of the enable signal can be set to half the code rate, i.e., Fchip/2, for instance to use the tracking module as acquisition module and acquire the signal with a reduced resolution.

What is claimed is:

1. A GNSS (Global Navigation Satellite System) receiver apparatus, the receiver apparatus comprising:
   a tracking module;
   a bank of correlators configured to receive in-phase and quadrature versions of a received signal;
   a code numerical controlled oscillator configured to determine a code frequency;
   a GNSS pseudo random noise sequence generator configured to generate a pseudo random noise sequence at the code frequency set by the code numerical controlled oscillator;
   a GNSS pseudo random noise delayed sequence generator comprising a first delay line with a first shift register and a second delay line with a second shift register, each shift register having a plurality of flip-flops arranged in series with taps at an output of each flip-flop, the pseudo random noise sequence coupled to an input of a first shift register, wherein taps of the shift registers are selectable as a punctual replica, an early replica and a delayed replica of the pseudo random noise sequence based on a selection signal issued by control logic of the receiver apparatus; and
   an enable circuit configured to generate an enable signal coupled to an enable input of the flip-flops, the enable signal operating at a selectable enable frequency.

2. The receiver apparatus according to claim 1, wherein the enable circuit is configured to select the enable frequency to be greater than the code frequency of the code numerical controlled oscillator.

3. The receiver apparatus according to claim 1, wherein the enable circuit comprises an edge detector comprising a plurality of parallel branches.

4. The receiver apparatus according to claim 3, wherein the code numerical controlled oscillator is coupled to the branch inputs of the edge detector so that bit signals, including a most significant bit and one or more following bits, are coupled from an output of the code numerical controlled oscillator and supplied at the branch inputs of the edge detector.

5. The receiver apparatus according to claim 4, wherein the edge detector further comprises a multiplexer having an output coupled to the input of the GNSS pseudo random noise delayed sequence generator, the multiplexer configured to select an output of one of the branches as the enable signal.

6. The receiver apparatus according to claim 5, wherein the multiplexer is configured to output the enable signal aligned with an edge of a bit signal of the code numerical controlled oscillator.

7. The receiver apparatus according to claim 5, wherein each branch of the edge detector includes a negative edge detector circuit configured to generate a signal at the code frequency or at a multiple of the code frequency.

8. The receiver apparatus according to claim 7, wherein the negative edge detector circuit is configured to generate the signal at the code frequency when the branch is coupled to the bit signal derived from the most significant bit and is configured to generate the signal at a multiple of the code frequency when the branch is coupled to the bit signal derived from a following bit.

9. The receiver apparatus according to claim 7, wherein the signal is generated to advance the pseudo random noise sequence generator.

10. The receiver apparatus according to claim 1, wherein the enable circuit comprises a second numerical controlled oscillator coupled to be controlled by the control logic by a specific frequency setting command to generate the enable signal at a determined frequency.

11. The receiver apparatus according to claim 10, wherein the control logic is coupled to a frequency setting logic that is configured to receive a pulse generated by the code numerical controlled oscillator to advance the pseudo random noise sequence generator, the frequency setting logic being configured to synchronize the specific frequency setting command with the pulse.

12. A method for generating a GNSS pseudo random noise delayed sequence in the GNSS receiver apparatus according to claim 1, the method comprising selecting an enable signal and coupling the selected enable signal to an enable input of each flip-flop.

13. The method according to claim 12, wherein selecting the enable frequency comprises selecting an enable frequency that is greater than the code frequency.

14. The method according to claim 12, further comprising changing the enable frequency during operation of the GNSS receiver apparatus according to an operation phase of the GNSS receiver apparatus.

15. The method according to claim 12, further comprising changing a spacing between the early replica and the delayed replica of the pseudo random noise sequence.

16. A GNSS (Global Navigation Satellite System) receiver apparatus comprising a tracking module comprising a plurality of tracking channels, each tracking channel comprising:
a bank of correlators configured to receive in-phase and quadrature versions of a received signal;
a code numerical controlled oscillator configured to determine a code frequency;
a GNSS pseudo random noise sequence generator configured to generate a pseudo random noise sequence at the code frequency set by the code numerical controlled oscillator;
a GNSS pseudo random noise delayed sequence generator comprising a first delay line with a first shift register and a second delay line with a second shift register, each shift register having a plurality of flip-flops arranged in series with taps at an output of each flip-flop, the pseudo random noise sequence coupled to an input of a first shift register, wherein taps of the shift registers are selectable as a punctual replica, an early replica and a delayed replica of the pseudo random noise sequence based on a selection signal issued by control logic of the receiver apparatus; and
an enable circuit configured to generate an enable signal coupled to an enable input of the flip-flops, the enable signal operating at a selectable enable frequency.

17. A method for generating a GNSS Pseudo Random Noise delayed sequence in a GNSS receiver apparatus, the method comprising:
receive in-phase and quadrature versions of a received signal;
determining a code frequency,
generating a pseudo random noise sequence at the code frequency,
generating an enable frequency by selecting one of a plurality of possible enable frequencies;
generating a punctual replica of the pseudo random noise sequence, the punctual replica being generated at the enable frequency;
generating an early replica of the pseudo random noise sequence, the early replica being generated at the enable frequency,
generating a delayed replica of the pseudo random noise sequence, the delayed replica being generated at the enable frequency; and
selecting one of the punctual replica, the early replica or the delayed replica.

18. The method according to claim 17, wherein selecting the enable frequency comprises selecting an enable frequency that is greater than the code frequency.

19. The method according to claim 17, further comprising changing the enable frequency during operation of the GNSS receiver apparatus according to an operation phase of the GNSS receiver apparatus.

20. The method according to claim 17, further comprising changing a spacing between the early replica and the delayed replica of the pseudo random noise sequence.

* * * * *